Figure 1:
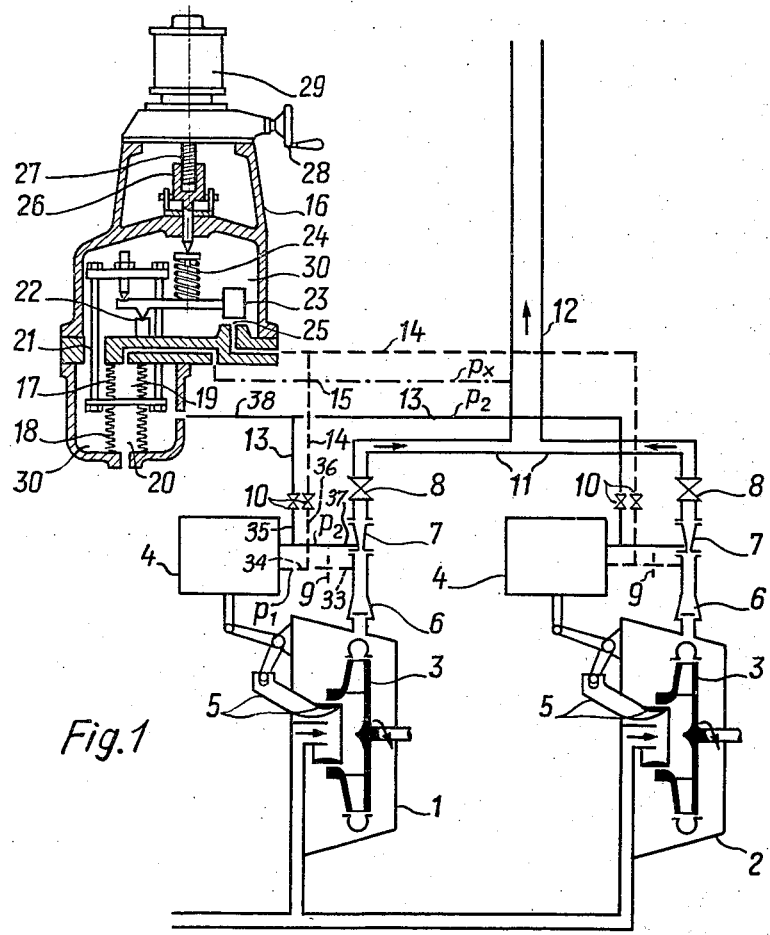

July 25, 1961

R. MOREILLON 2,993,640

METHOD OF AND APPARATUS FOR MAINTAINING A CONSTANT PRESSURE AT VARYING CAPACITY OR A CONSTANT CAPACITY AT VARIABLE PRESSURE IN A TURBO-COMPRESSOR

Filed May 13, 1957

3 Sheets-Sheet 1

INVENTOR:
RAYMOND MOREILLON
by Frederich Breitenfeld
ATTORNEY

United States Patent Office 2,993,640
Patented July 25, 1961

2,993,640
METHOD OF AND APPARATUS FOR MAINTAINING A CONSTANT PRESSURE AT VARYING CAPACITY OR A CONSTANT CAPACITY AT VARIABLE PRESSURE IN A TURBO-COMPRESSOR
Raymond Moreillon, Bassersdorf, Switzerland, assignor to Oerlikon Engineering Company, Zurich, Switzerland, a corporation of Switzerland
Filed May 13, 1957, Ser. No. 658,669
Claims priority, application Switzerland May 22, 1956
13 Claims. (Cl. 230—115)

This invention relates to a method of maintaining a constant pressure at varying capacity or a constant capacity at varying pressure in a turbo-compressor equipped with an anti-surging control governed by a pressure differential, the said control varying the inlet section to the impeller ducts by means of a throttle valve. The invention also relates to apparatus for carrying out said method.

It is known that the pressure of a turbo-compressor can be maintained at constant level despite variations in capacity, by means of flow control valves. Devices are also known which permit a constant capacity to be maintained despite fluctuations in pressure. Moreover, regulators are also known which prevent the compressor from surging. However, in order to provide a compressor which is stable in operation and which can be controlled to maintain either constant pressure or constant capacity, several regulating units would be required and without further measures these would fail to cooperate satisfactorily. Such equipment would be both complicated and expensive and it would still not ensure the required degree of operational reliability.

The present invention aims at obviating the disadvantages inherent in known devices and provides a method in which the pressure differential governing the anti-surging control is diminished by a regulating device whenever the pre-set required constant value of pressure or capacity is exceeded, so that the consequent operation of the throttle valve causes the required value to be reestablished.

In carrying out this method the anti-surging control is connected with a regulating device comprising a spring bellows unit which is acted upon by the quantity that is to be maintained at constant level and which is adapted by means of a rod linkage to actuate a spring-loaded regulating lever which opens a nozzle for the purpose of diminishing the pressure differential that governs the operation of the anti-surging control by permitting the higher pressure medium to mix with the lower pressure medium, means being provided for setting the bias of the spring.

According to other features of the invention the nozzle may be controlled either by the static pressure in the pressure pipe of the compressor or by the pressures in a flow meter. By the provision of a simple auxiliary regulating device a turbo-compressor will thus be created which in the stable range of its set of characteristic curves will operate either at constant pressure and variable capacity or at constant capacity and variable pressure. Moreover, it is expedient to arrange for the synchronous control by the regulating device of the anti-surging controls of several turbo-compressors operating in parallel.

FIG. 1 of the accompanying drawings illustrates diagrammatically and by way of example one form of construction of apparatus according to the invention.

The two turbo-compressors 1 and 2 each comprise at least one impeller 3. 4 are the anti-surging controls which control the position of the throttle valves 5. Pressure ducts 11 which serve pipe line 12 incorporated non-return valves 6, measuring devices 7 (such as Venturi tubes) and valves 8. 9 is a flow-reducing orifice, 10 are shut-off valves, and 13, 14, 15 pipe lines. A pipe 33 connects pressure duct 11 to the flow-reducing orifice 9, and a pipe 34 connects the orifice 9 to the anti-surging control 4. A pipe 37 connects the measuring device 7 to the anti-surging control, and pipes 35 and 36 connect the pipes 37 and 34 respectively to the shut-off valves 10. Finally, a pipe 38 connects the pipe 13 to the chamber 30 of the regulating device 16. The regulating device 16 which serves to mix the medium at different pressures comprises spring bellows 17, 18 with internal chambers 19 and 20. Through a rod 21 the spring bellows unit acts upon the regulating lever 23 which is mounted at 22 and loaded by a spring 24. This lever 23 controls the valve 25. The bias of the spring can be adjusted by means of a plunger 26 operable by a spindle 27. The spindle can be actuated either by means of a handwheel 28 or a servo-motor 29.

Figure 2:
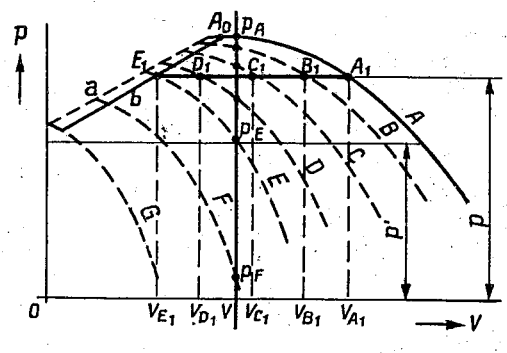

The manner of operation of the equipment will be hereinafter described with reference to FIG. 2 of the accompanying drawings which is a chart representing the operational characteristics of a turbo-compressor showing the relationship between capacity and pressure.

Curve A represents the operation of the compressor when the valve 5 is open, whereas curves B, C, D, E, F relate to intermediate positions of the valve, and curve G is the $p$—$V$ diagram when the valve is closed. Line $a$ characterises the pumping limit of the compressor, and line $b$ is the programming curve of the anti-surging control.

Let it first be assumed that the shut-off valves 10 are closed. The regulating device 16 is then inoperative. Under these conditions, if the capacity is increased from $V_{E_1}$ to V, then the anti-surging control will control the compressor along the characteristic curve $b$ from the operating point $E_1$ to point $A_0$ on curve A. The compressor then operates along this curve. The variation in capacity is therefore accompanied by a change in pressure from $p$ to $pA$. Assuming now that it is desired to maintain a constant pressure despite the variation in capacity, the valves 10 are opened, whereby the regulating device 16 becomes operative. Its effect upon the operation of the compressor is then as follows: So long as the output pressure $p_x$ (FIG. 1) is less than the pre-set required value $p$, the spring 24 will keep nozzle 25 closed through the regulating lever 23. The pressure $p_2$ of the measuring instrument 7 will then obtain inside chamber 30. The operating points of the compressor are therefore on curve $b$. However, if the pressure $p_x$ should exceed the preset required value, then the pressure inside chamber 19 will exceed the pressure in chamber 20 sufficiently to enable the bellows unit to cause a deflection of the regulating lever 23 through the link 21 in such manner as to open the nozzle 25. The medium which is the static pressure $p_1$ will now enter the chamber 30 and there mix with the medium at the lower pressure. Although the volume escaping through the nozzle 25 is very small, the pressure difference $p_1$—$p_2$ at the entry to the anti-surging control is nevertheless effective, since the flow-reducing orifice 9 prevents rapid flow of fluid from the duct 11. The control 4 thereupon closes the throttle 5 until the pressure in the outlet duct 12 has fallen back to the desired level and equilibrium in the system has been restored. The operational points along the horizontal constant-pressure line $E_1$—$A_1$ will then correspond with capacities varying between $V_{E_1}$ and $V_{A_1}$. If a smaller bias is given to spring 24 by operation of the handwheel 28 or of the servo-motor 29, then the value of the desired constant pressure may be reduced say to $p'$ (FIG. 2).

Figure 3:
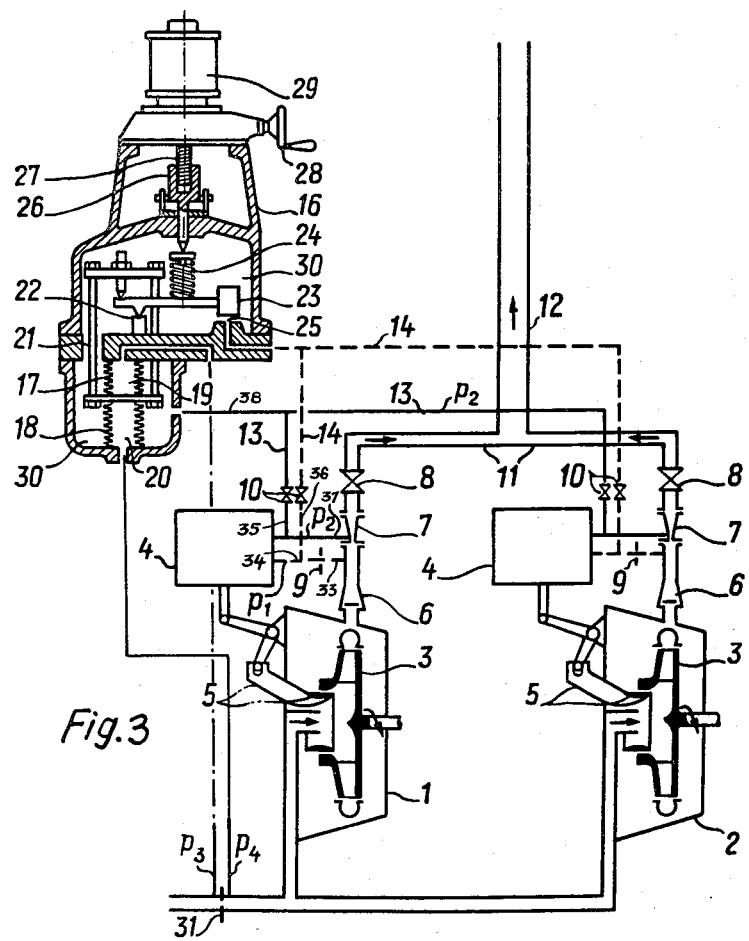

Referring now to FIG. 3, the equipment according to the invention is suitable not only for the maintenance of constant pressure at varying capacity but may also be used for the maintenance of constant capacity at variable pressure. To this end the regulating device 16 is used in conjunction with a flow restricting orifice 31 from which the pressures $p_3$ and $p_4$ can be tapped, $p_3$ being the higher and $p_4$ the lower pressure. The interior 19 of the spring bellows unit is at the pressure $p_3$, whereas chamber 20 is at $p_4$. If the capacity is less than the pre-set value, nozzle 25 will be closed and the anti-surging control will operate according to programme. However, as soon as the capacity, or the pressure differential $p_3 - p_4$, exceeds the required value, nozzle 25 will open and modify the action of the anti-surging control as has been described. The throttle will therefore be adjusted until the required value is restored. In this form of regulation the operational points $p_A - p_F$ can thus be established.

Figure 4:
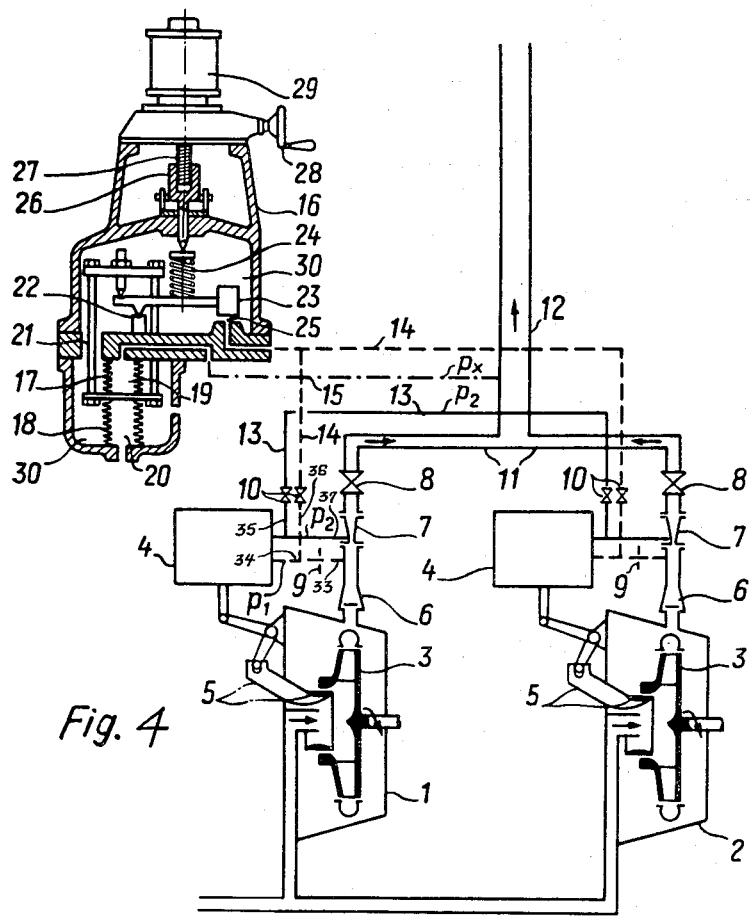

Referring to FIG. 4, it will be seen that the invention may be modified if desired by eliminating the pipe 38, thus disconnecting the chamber 30 of the regulating device 16 from the pipe line 13 and opening it directly to the atmosphere.

What I claim is:

1. In a turbo-compressor having an inlet and an adjustable throttle therefor, a surge control responsive to fluid pressure differentials, means for subjecting said surge control to the pressure differentials engendered by surges in the flow of output fluid, means actuated by said surge control for adjusting said throttle to reduce said inlet as said pressure differential decreases, a regulating device for independently diminishing said pressure differential, thereby reducing said inlet, and fluid pressure means for automatically activating said regulating device in response to deviations in fluid flow through the compressor.

2. In a turbo-compressor, the combination of elements defined in claim 1, said last-named fluid pressure means being responsive to an increase in the pressure of the output fluid beyond a predetermined value.

3. In a turbo-compressor, the combination of elements defined in claim 1, said last-named fluid pressure means being responsive to an increase in the quantity of the output fluid beyond a predetermined value.

4. In a turbo-compressor, the combination of elements defined in claim 1, said regulating device comprising a means for mixing the fluids creating said pressure differential.

5. In a turbo-compressor, the combination of elements defined in claim 1, said regulating device comprising conduits communicating respectively with the fluids creating said pressure differential, and a nozzle connecting said conduits and adapted to be opened and closed.

6. In a turbo-compressor, the combination of elements defined in claim 1, said regulating device comprising conduits communicating respectively with the fluids creating said pressure differential, a nozzle connecting said conduits, and a movable plug controlled by said activating means for opening and closing said nozzle.

7. In a turbo-compressor, the combination of elements defined in claim 1, said regulating device comprising conduits communicating respectively with the fluids creating said pressure differential, a nozzle connecting said conduits, a spring-biased regulating lever controlled by said activating means, a plug carried by said lever and movable to open and close said nozzle, and means for adjusting the tension of the biasing spring.

8. In a turbo-compressor, the combination of elements defined in claim 1, said regulating device comprising conduits communicating respectively with the fluids creating said pressure differential, a nozzle connecting said conduits, and a movable plug controlled by said activating means for opening and closing said nozzle, said activating means comprising a bellows formed with two separated chambers, said bellows being movable under the influence of different fluid pressures in said chambers respectively, and a linkage between said bellows and plug.

9. In a turbo-compressor, the combination of elements defined in claim 1, said means for subjecting the surge control to surge-engendered pressure differentials comprising a flow-measuring instrument in the output line of the compressor, said instrument developing a variable reduced pressure therein, and conduits leading from said surge control to the higher pressure and lower pressure regions, respectively, of said output line.

10. In a turbo-compressor, the combination of elements defined in claim 1, said means for subjecting the surge control to surge-engendered pressure differentials comprising a flow-measuring instrument in the output line of the compressor, said instrument developing a variable reduced pressure therein, and conduits leading from said surge control to the higher pressure and lower pressure regions, respectively, of said output line, there being a flow-reducing orifice in the conduit which leads to the higher pressure region.

11. In a turbo-compressor having an inlet and an adjustable throttle therefor, a surge control responsive to fluid pressure differentials, means for subjecting said surge control to the pressure differentials engendered by surges in the flow of output fluid, means actuated by said surge control for adjusting said throttle to reduce said inlet as said pressure differential decreases, a regulating device for independently diminishing said pressure differential, thereby reducing said inlet, and fluid pressure means for activating said regulating device, said activating means comprising a bellows formed with two separated chambers, said bellows being movable under the influence of different fluid pressures in said chambers respectively, and an activating linkage movable by said bellows.

12. In a turbo-compressor having an inlet and an adjustable throttle therefor, a surge control responsive to fluid pressure differentials, means for subjecting said surge control to the pressure differentials engendered by surges in the flow of output fluid, means actuated by said surge control for adjusting said throttle to reduce said inlet as said pressure differential decreases, a regulating device for independently diminishing said pressure differential, thereby reducing said inlet, and fluid pressure means for activating said regulating device, said regulating device comprising conduits communicating respectively with fluids creating said pressure differential, a nozzle connecting said conduits, and a movable plug controlled by said activating means for opening and closing said nozzle, said activating means comprising a bellows formed with two separated chambers, said bellows being movable under the influence of different fluid pressures in said chambers respectively, and an activating linkage movable by said bellows and operatively interposed between said bellows and said plug.

13. In a turbo-compressor installation in which each of several compressors has an inlet and an adjustable throttle therefor, a surge control for each compressor responsive to fluid pressure differentials, means for subjecting each surge control to the pressure differentials engendered by surges in the flow of output fluid from its compressor, means actuated by each surge control for adjusting the throttle of its compressor to reduce the inlet as said pressure differential decreases, a common regulating device for simultaneously diminishing the pressure differentials of all said surge controls, thereby reducing all inlets, means for activating said regulating device, and a common conduit for the output of said compressors.

References Cited in the file of this patent

UNITED STATES PATENTS

| | | |
|---|---|---|
| 1,924,930 | Huff | Aug. 29, 1933 |
| 2,353,201 | Talbot | July 11, 1944 |
| 2,529,415 | Phelan | Nov. 7, 1950 |
| 2,786,420 | Kenney | Mar. 26, 1957 |

FOREIGN PATENTS

| | | |
|---|---|---|
| 744,317 | Great Britain | Feb. 1, 1956 |